United States Patent
Prest

(10) Patent No.: US 8,424,162 B2
(45) Date of Patent: Apr. 23, 2013

(54) MULTI-POSITION MAGNETIC DETENTS

(75) Inventor: Christopher D. Prest, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/095,817

(22) Filed: Apr. 27, 2011

(65) Prior Publication Data
US 2011/0199171 A1    Aug. 18, 2011

Related U.S. Application Data

(62) Division of application No. 11/759,499, filed on Jun. 7, 2007, now Pat. No. 7,934,291.

(51) Int. Cl.
*E05D 11/10*    (2006.01)
*H01F 7/20*    (2006.01)

(52) U.S. Cl.
USPC ............................. 16/320; 335/285; 335/306

(58) Field of Classification Search .................. 335/285, 335/302, 306; 16/320
See application file for complete search history.

(56) References Cited

U.S. PATENT DOCUMENTS

| | | | |
|---|---|---|---|
| 3,375,512 A * | 3/1968 | Watkins et al. | 340/815.63 |
| 4,941,236 A * | 7/1990 | Sherman et al. | 24/303 |
| 6,424,245 B1 | 7/2002 | Rector et al. | |
| 6,630,878 B2 | 10/2003 | Pan et al. | |
| 6,831,541 B1 * | 12/2004 | Seidler | 335/306 |
| 6,922,123 B2 | 7/2005 | Lalonde et al. | |
| 7,619,376 B2 * | 11/2009 | Hiroe et al. | 318/2 |
| 2004/0124717 A1 * | 7/2004 | Corcoran et al. | 310/12 |
| 2005/0210629 A1 * | 9/2005 | Seidler et al. | 16/320 |

* cited by examiner

*Primary Examiner* — Ramon Barrera
(74) *Attorney, Agent, or Firm* — Kilpatrick Townsend & Stockton LLP

(57) ABSTRACT

Various embodiments for magnetic detent assemblies provide for detent devices with improved performance and manufacturability. In one embodiment, magnetic detent assemblies provide for custom detent positions and custom force profiles by including a pair of unitary magnetic components each having a special geometry. In an embodiment, the changing area of overlap (and hence magnetic flux) between the magnetic components can give rise to the custom detent positions and custom force profiles. In a specific embodiment, the magnetic components can comprise an N-point star shaped geometry, where the number and distribution of the start wings can be varied to define customized detent positions and the contour of the star wings can be varied to create customized force profiles. In other embodiments, devices such as laptop computers and docking stations for handheld electronic devices can implement multi-position detent hinges with the magnetic detent assemblies.

24 Claims, 9 Drawing Sheets

MULTI-POSITION MAGNETIC DETENTS

CLAIM OF PRIORITY

The present application claims priority from and is a continuation application of U.S. application Ser. No. 11/759,499, entitled "Multi-Position Magnetic Detents" filed Jun. 7, 2007, the entire contents of which are herein incorporated by reference for all purposes

BACKGROUND

A detent is a catch or a lever mechanism that defines resting positions as one part of an assembly moves relative to another part. Conventional detent devices typically rely on mechanical means, such as a lever and socket combination, to restrict the movement of the system in defining the resting positions. One type of detent is a rotational device that divides the rotation of a wheel, shaft or hinge into discreet increments where the fixed discreet increments define the detent positions. These mechanical systems commonly employ a small gravity or spring actuated lever paired with a notched shaft to help define the detent positions.

In addition to defining detent positions, some detent devices offer self-centering forces that help to align and move the detent bodies into detent positions when the detent bodies are perturbed from their detent positions. In mechanical detents, centering mechanisms can include a wide diversity of contraptions including springs, levers, balls, etc. As a rotating mechanism is rotated to misalign two detent bodies from a detent position, a self-centering force will arise to slow the rotation and position the rotating detent bodies back into alignment. When a perturbing force is large enough to overcome the self-centering force to move a body completely out of the force field of a first detent position, another self-centering force will arise to place the bodies into another, typically adjacent, detent position force field, thereby moving the bodies into the other detent position.

Existing detent mechanisms therefore typically require two bodies with surfaces that slide against each other. Friction between these two surfaces and other environmental effects cause the force profile offered by the detents to change over time. This may result in less than optimum performance as the device wears. Because these types of detent devices also involve multiple parts such as shafts, sockets, levers, springs, etc., tolerance requirements can also add to the complexity and cost of the device manufacture and assembly. There is therefore a need for detent systems with improved performance and manufacturability.

BRIEF SUMMARY

Various embodiments of the present invention are directed at detent systems using magnetic components. In one embodiment, the present invention may provide a robust magnetic assembly that employs a single magnetic component per body. In the single magnet embodiment, instead of using a plurality of components, a single magnetic component in each body of the detent mechanism may feature a customized geometry that creates a customized set of detent positions and/or force profiles. The single magnet detent system of the present invention can require fewer parts and can therefore be easier and more cost-effective to manufacture. A single unitary piece of magnet, for example, may be easier to mold and manufacture than a plurality of separate parts that have to be subsequently assembled with specific tolerances.

Accordingly, in one embodiment, the present invention may include a magnetic detent assembly having a first body and a second body, with each of the first body and the second body having a magnetic component characterized by a special geometry wherein an area of overlap between the first body and the second body is varied as the bodies move relative to each other. The change in the magnetic flux passing between the first body and the second body as they move relative to each other may give rise to a plurality of detent positions. Depending on the specific embodiments, either the plurality of positions with local minimums of magnetic fluxes or the plurality of positions with local maximums of magnetic fluxes can be made to define the plurality of detent positions. The magnetic components can be made of materials such as magnetic, ferromagnetic, or ferrous materials. In an alternative embodiment, the magnetic components may further comprise electromagnetic components.

In another embodiment, the magnetic components can be made to include a pair of matched geometries. The term matched geometries as used herein is not limited to geometries that have identical shape (i.e. identical contour and size), but can also include geometries with dissimilar shapes. In a specific embodiment, the pair of matched geometries may comprise a single N-point star shape, where the number of protrusions or wings N can be varied to define N number of detent positions. In a further embodiment, the contour of the N-point star shape magnetic components may be modified to produce a customized force profile. The N-point star shape may be used in a detent where the first body and the second body are designed to rotate with respect to each other. In another embodiment, the N-point star shape detent may be adapted for use in a hinge system. In another embodiment, the N-point star shape detent can also be adapted for use in a sealed system where the sealed system may be waterproof, dustproof, or both.

In a specific embodiment, the magnetic components of a magnetic detent assembly can be adapted not just to create customized detent positions and customized force profiles, but also to hold a first detent body in close proximity to a second detent body. In an alternative embodiment, mechanical means can be used to hold the first detent body and the second detent body in close proximity.

In a specific embodiment, the first and second detent bodies of a detent assembly can include magnetic components that are adapted to move along certain predefined dimensions. In one specific embodiment, the detent bodies can be adapted to move relative to each other along one linear dimension. In another specific embodiment, the detent bodies can also be adapted to move relative to each other along a single axis of rotation. Where the detent bodies are adapted to move relative to each other along a single axis of rotation, for example, the detent assembly can be further adapted to be part of a hinge.

A better understanding of the nature and advantages of the present invention can be gained by reference to the detailed description below and the accompanying drawings.

DETAILED DESCRIPTION

Figure 1:
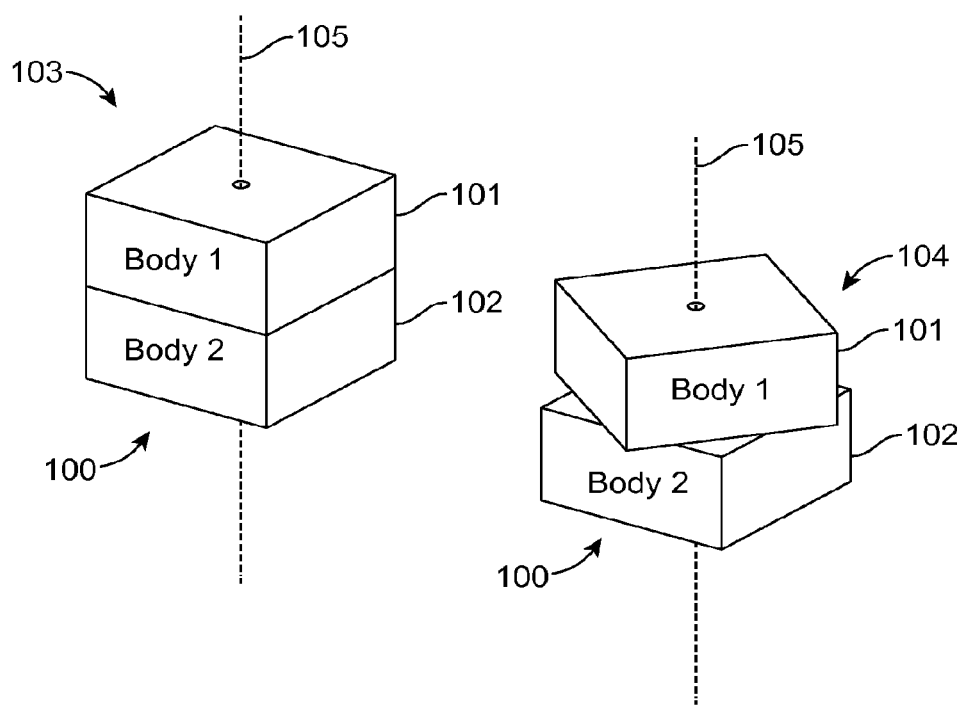
FIG. 1 illustrates a general detent assembly.

The present invention is directed at magnetic detents and systems employing magnetic detents. FIG. 1 illustrates the general principle of a magnetic detent. Depicted in FIG. 1 is detent 100 comprising a first body 101 and second body 102. In this example, first detent body 101 and second detent body 102 are adapted to rotate about a common axis of rotation 105. FIG. 1 depicts detent 100 in two detent positions 103 and 104. When detent bodies 101 and 102 are in one of the two detent positions, they are in a configuration of relative stability with respect to each other. Depending on the strength of magnetic forces holding detent body 101 and detent body 102 in a detent position, a small perturbation of an external force on either bodies may not move the detent bodies out of a detent position. If a small enough force is applied, a self-aligning force will arise to move the detent bodies 101 and 102 back to the initial detent position. A larger perturbation of an external force on either body may however overcome the self-aligning force to move the bodies out of the initial detent position. In the example shown in FIG. 1, if detent positions 103 and 104 are the only detent positions provided by detent 100, an application of a large external force will move the detent bodies successively between detent positions 103 and 104.

Figure 2:
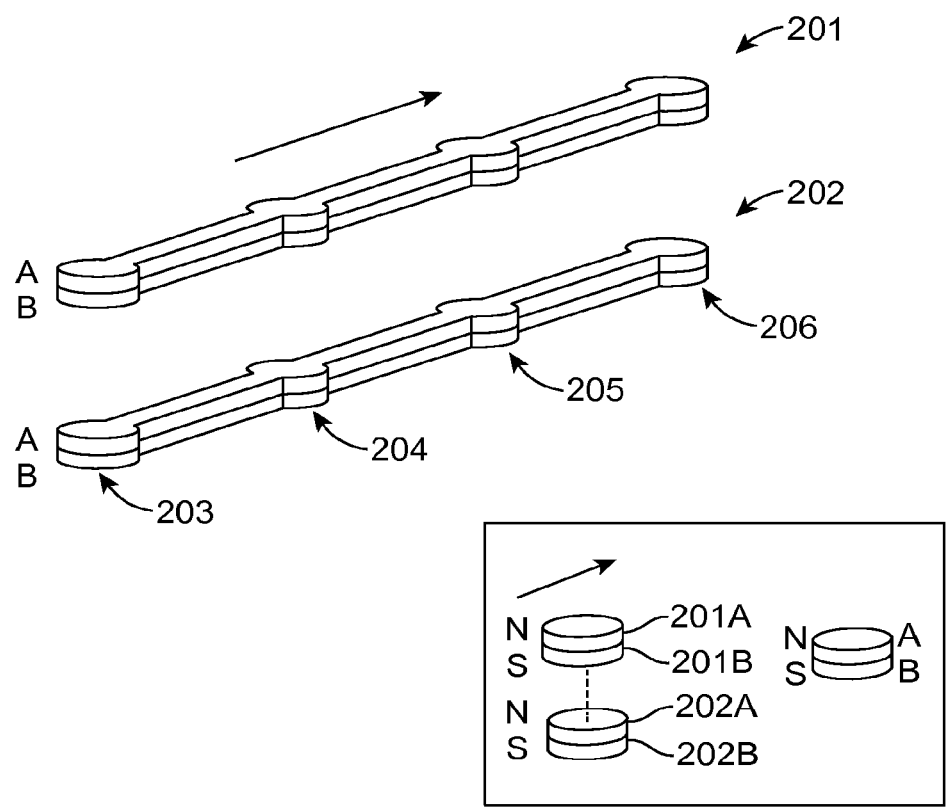
FIG. 2 illustrates a simplified view of a linear, single dimension-based magnetic detent in accordance with one embodiment of the invention.

FIG. 2 shows a simplified view of a linear, single dimension-based magnetic detent in accordance with one embodiment of the invention. As can be seen in this exemplary embodiment, the magnetic detent may comprise two magnetic components 201 and 202 featuring predefined geometries that match. In the specific embodiment, the pair of geometries comprises a flat linear shape with four bulges, defining a set of overlapping areas as the pair is moved along each other. In this embodiment, as well as throughout this application, the term magnetic component may refer to a component comprising either a permanent magnet or a ferromagnetic or ferrous material or a magnetic component comprising electromagnetic subcomponents. In the embodiment of FIG. 2, each of the magnetic components may be made of a magnetic material and may include a top portion A and a bottom portion B, as indicated by the different shadings. The inset shows, in accordance with the embodiment, that the top portion A, corresponding to portions 201A and 202A of magnetic components 201 and 202, respectively, may represent a north pole of the magnetic components. The bottom portion B, corresponding to portions 201B and 202B of magnetic components 201 and 202, respectively, may correspond to a south pole of the magnetic components. In accordance with another aspect of this embodiment, each of the magnetic components 201 and 202 may also be characterized by four bulges 203, 204, 205, and 206 that can define four detent positions. The number of bulges in the embodiment of FIG. 2 is illustrative only and can be varied depending on the application.

In the embodiment shown in FIG. 2, because of the pole arrangements of components 201 and 202, the position where the overlap of the magnetic flux between components 201 and 202 is at a maximum may also define a position of maximum relative stability between the two detent bodies. The initial position where all four bulges overlap and line up may thus represent a dominant detent position. As magnetic component 201 moves in the direction of the arrow over magnetic component 202, the overlap of the magnetic flux decreases, placing the magnetic detent into a configuration of relative instability. As magnetic component 201 moves further along the direction of the arrow, however, the bulges of magnetic components 201 and 202 may line up again, increasing the overlap of magnetic flux, placing the magnetic detent back into a configuration of relative stability again. This second detent position may be less dominant than the first because only three bulges line up. The amount of perturbation force needed to move the assembly out of this second detent position may be less than that required for the initial detent position.

Figure 3:
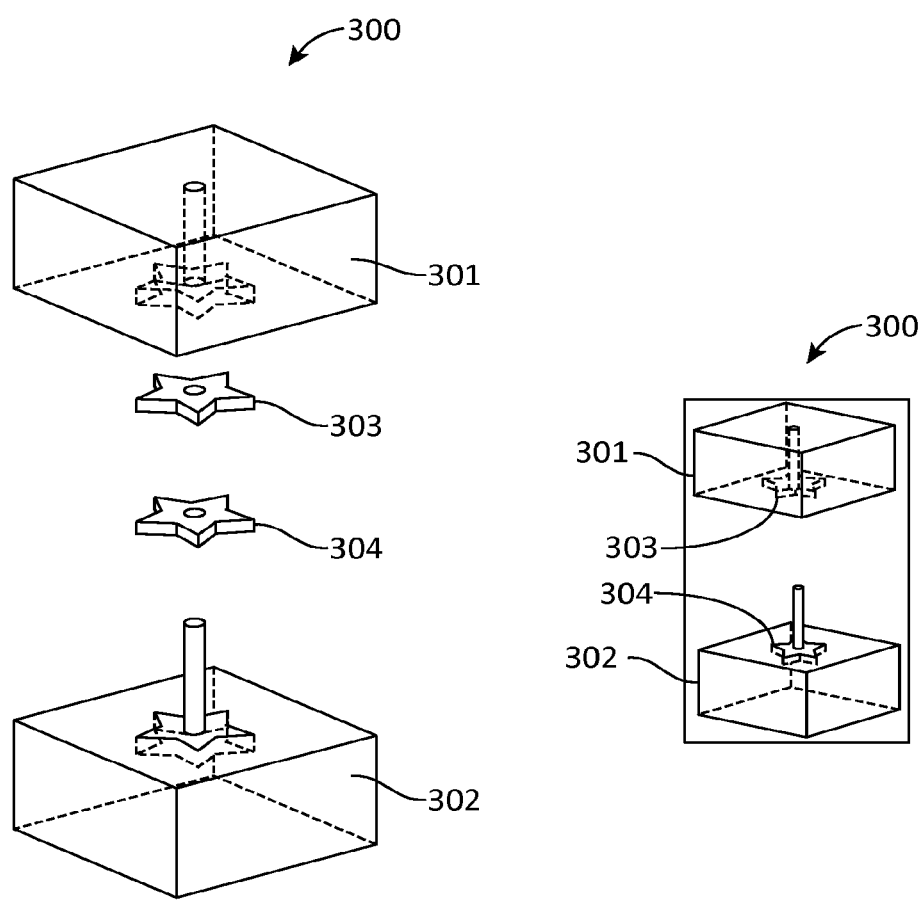
FIG. 3 illustrates a simplified view of a rotation-based magnetic detent in accordance with one embodiment of the invention.

FIG. 3 shows a simplified view of rotating magnetic detent 300 in accordance with another embodiment of the invention. As illustrated, magnetic detent 300 comprises a first detent body 301 having magnetic component 303 and second detent body 302 having magnetic component 304. In one embodiment, magnetic components 303 and 304 may be made up of a magnetic, ferromagnetic, or ferrous material. In a further embodiment, magnetic component 303 may be made of a permanent magnetic material, and magnetic component 304 may include an attraction plate made of a ferromagnetic material such as steel. In yet another embodiment, at least one of the magnetic components may be made of an electromagnetic subcomponent where the magnetic flux can be turned on and off with the application of electric power.

Figure 4:
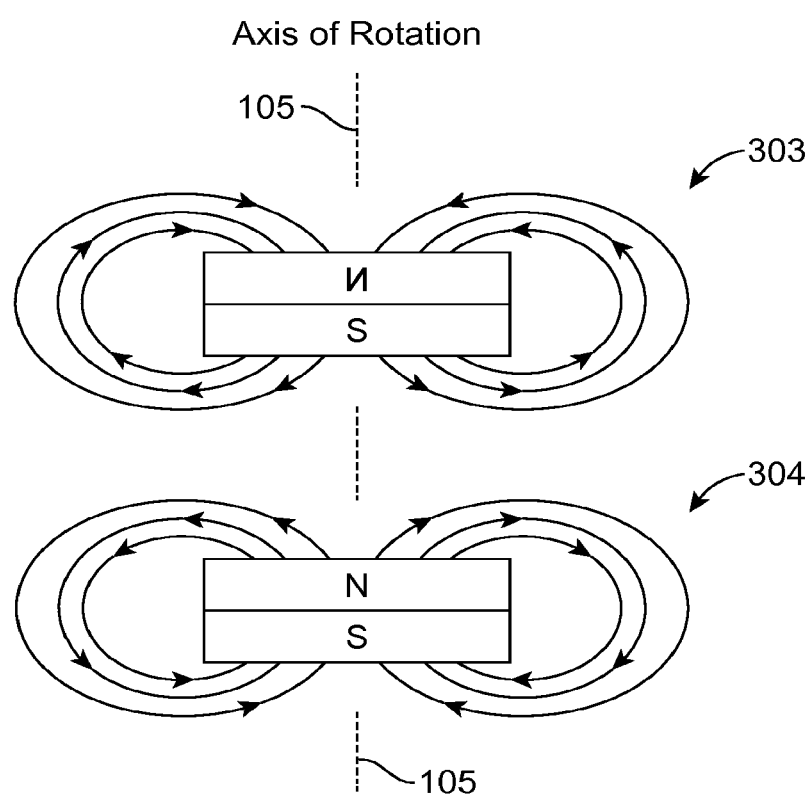
FIG. 4 illustrates a side view of a rotation-based magnetic detent showing an example of magnet orientation in accordance with one embodiment of the invention.

In the embodiment of FIG. 3, magnetic components 303 and 304 may feature a unitary N-point star geometry, the N points indicating the number of "wings" in the N-point star geometry, where the number N and the shape of the wings can be varied to define a set of customized detent positions and force profiles. The number of wings may define the number of detent positions magnetic components 303 and 304 may encounter as detent bodies 301 and 302 are rotated about each other. A larger number of wings may provide more detent positions while a fewer number of wings may result in fewer detent positions. FIG. 4 illustrates a side profile of the magnetic fields in relation to the magnetic components of the N-point star geometry.

Depending on the shape and contour of the wings, as detent bodies 301 and 302 are rotated about each other, the profile of self-centering forces magnetic components 303 and 304 will encounter as they repel and attract each other can also be customized. In a specific embodiment, the design of a pair of custom matched geometries may be obtained first by determining the custom force profile needed, second by designing a sequences of areas of overlaps that would give rise to the required custom force profile, and third by creating a pair of matched unitary geometries (one for each of the complementary magnetic components) that would give rise to the sequences of areas of overlaps as the two detent bodies are moved relative to each other. In general, the pair of matched geometries may or may not be the same. In the embodiment shown in FIG. 3, the pair of matched geometries are the same—both defined by a unitary N-point star geometry.

Figure 5:
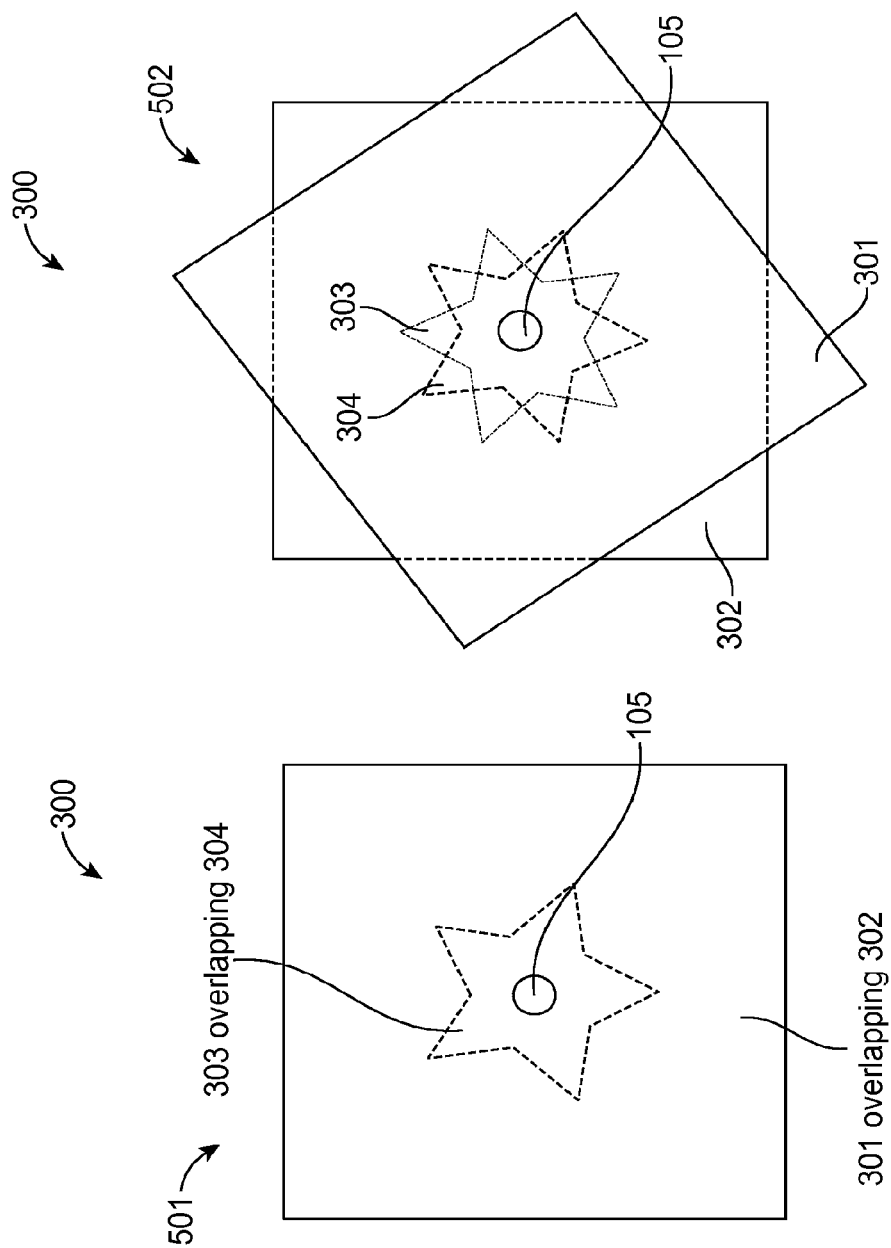
FIG. 5 illustrates a magnetic detent structure that provides customized detent positions in accordance with one embodiment of the invention.

FIG. 5 depicts in more detail magnetic detent bodies with an exemplary 5-point star shaped geometry featuring five detent positions in accordance with an illustrative embodiment of the current invention. Depicted is a top-down perspective of magnetic detent 300 in configurations 501 and 502. In configuration 501, magnetic components 303 and 304 are aligned with each other. In configuration 502, magnetic components 303 and 304 are misaligned with respect to each other. In one embodiment, where magnetic component 303 can be made of a permanent magnet and magnetic component 304 can be made of an attraction plate of ferrous material, configuration 501 may define a configuration of relative stability while configuration 502 defines a configuration of relative instability. The configuration of relative stability may define five detent positions associated with detent 300. As detent bodies 301 and 302 are rotated with respect to each other about axis 105, the overlap of the magnetic fluxes between components 303 and 304 may reach a maxima in configuration 501 and a minima in configuration 502. Configuration 501 thus may represents five maxima positions spaced 72° apart from each other symmetrically around the axis of rotation 105. The symmetric geometry of the 5-point star shape may thus provides five symmetric, equivalent detent positions spread 72° around common axis of rotation 105. In one embodiment, the attraction forces between magnetic components 303 and 304 may be such that a small perturbation of an external force will not move detent bodies 301 and 302 out of detent configuration 501. A self-aligning force will realign detent bodies 301 and 302 back to detent configuration 501.

Figure 6:
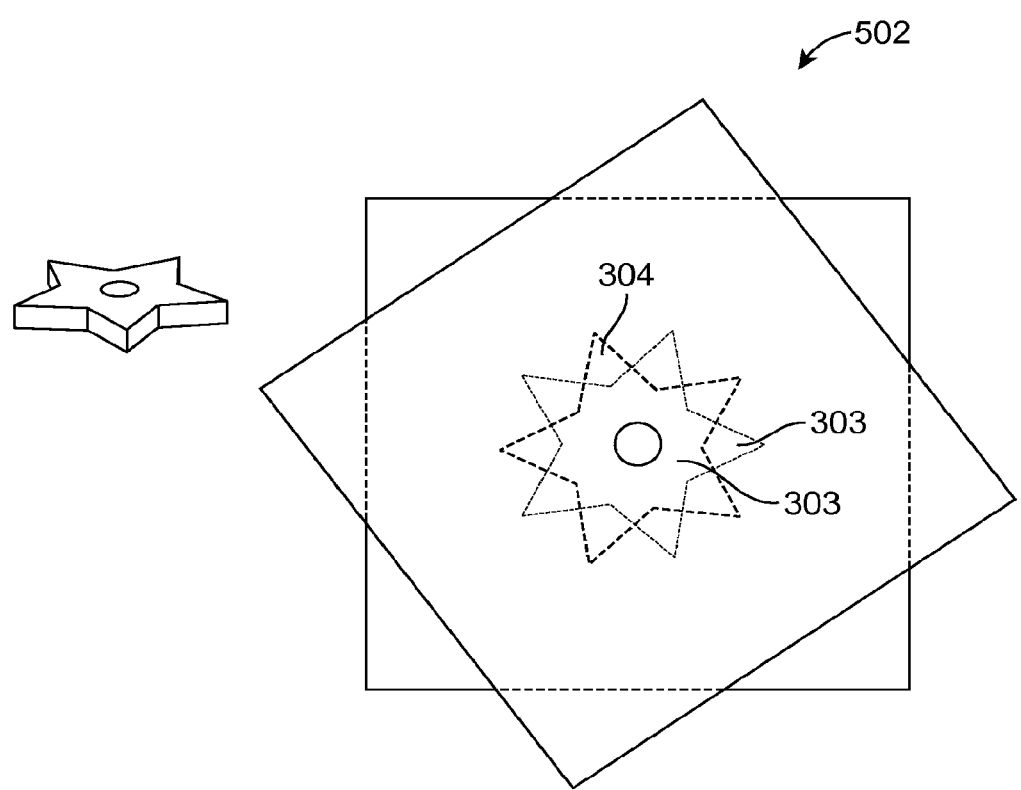
FIG. 6 illustrates a magnetic detent structure that provides for detent forces in accordance with one embodiment of the invention.

Configuration 502 represents five positions where the overlap of magnetic flux between 303 and 304 are minimal, corresponding to five positions of instability spaced 72° apart from each other symmetrically around the axis of rotation 105. FIG. 6 shows a magnetic detent that provides for customized detent positions in more detail. In the configuration shown in FIG. 6, the overlap of magnetic flux between magnetic components 303 and 304 is at a minimum, defining a position of relative instability. In one preferred embodiment, configuration 502 can be considered to be force barriers separating detent positions defined by configuration 501. If a perturbing force is small, the magnetic forces that arise between magnetic components 303 and 304 will place the detent back into configuration 501. If a perturbing force is large enough, the magnetic forces that arise between magnetic components 303 and 304 will not be strong enough to place the detent back into an initial detent position.

Figure 7:
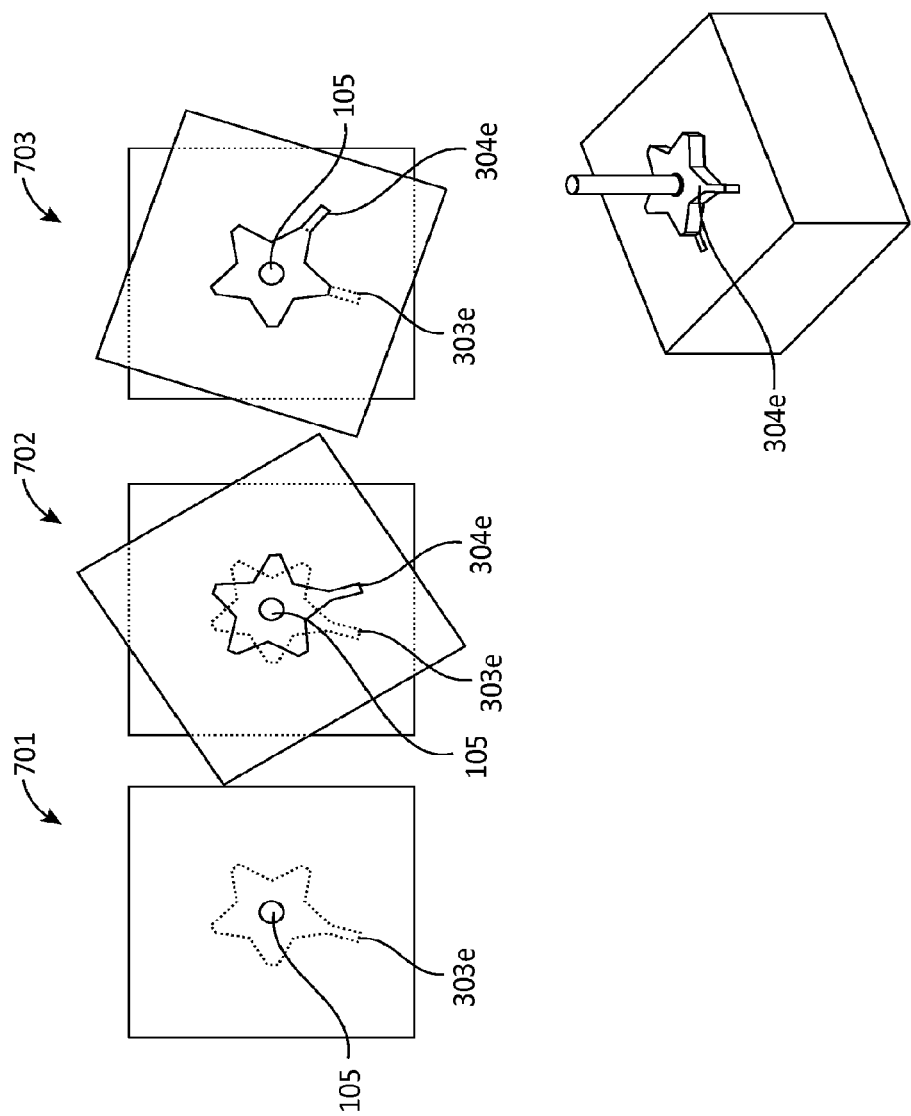
FIG. 7 illustrates a magnetic detent structure that provides for customized detent forces in accordance with one embodiment of the invention.

FIG. 7 illustrates an exemplary implementation of a magnetic detent that provides for a customized detent force profile in addition to providing for a customized set of detent positions in accordance with an embodiment of the invention. Depicted are top down perspectives of a magnetic detent 700 in two stable configurations 701 and 703 and one unstable configuration 702. In a specific embodiment, a customized force profile is implemented by adding an extension to one or more wings of star-shaped magnetic components 303 and 304. The resulting elongated wings 303e and 304e of magnetic components 303 and 304 create an asymmetrical star-shaped geometry. In such an embodiment, configuration 701 may represent the most stable configuration as magnetic detent bodies 301 and 302 are rotated about axis of rotation 105. In configuration 701, not only are the protrusions or wings of magnetic components 303 and 304 aligned, but their respective elongated portions or extensions 303e and 304e are also aligned, creating a maximal overlap of magnetic fluxes between components 303 and 304. As magnetic detent 700 is rotated, components 303 and 304 may become un-aligned and enter a configuration of relative instability 702. If an external force is small enough and is removed, a self-aligning force will move detent bodies 301 and 302 back into configuration 701. Continuing with the rotation, detent bodies 301 and 302 eventually enter into another detent position 703. However, because elongated portions 303e and 304e of asymmetrical star-shaped magnetic components 303 and 304 are no longer aligned, the overlap of the magnetic fluxes between components 303 and 304 while greater than that of configuration 702 will be less than that associated with configuration 701, potentially rendering detent configuration 703 stable but not as stable as configuration 701. The result is an asymmetric force profile where the force needed to move a detent in configuration 701 out of position will be greater than that needed to move a detent in configuration 703 out of position.

The extension of a wing is but one way to render the embodiment of the N-point star geometry asymmetric. For example, another method is to change the angles separating the wings of an N-point star geometry. In an embodiment, instead of 5 wings equally spaced at 72° apart, a geometry may have a pair of wings are separated at 40° apart and another pair separated 104° degrees apart. The total number of angles separating the 5 wings remains the same at 360° as the symmetric geometry. For example, instead of 5 angles of 72°, the asymmetric geometry has 3 angles of 72°, 1 of 40°, and 1 of 104°.

The general principles described in connection with the illustrative embodiment shown in FIGS. 6 and 7 can be applied to magnetic detents using a variety of shapes. That is, other geometries can also be used to provide for a dominant detent position among a plurality of other less dominant detent positions. In the embodiment shown in FIG. 6, a customized symmetric position profile can arise because the five wings of the 5-point star geometry (and hence detent positions) are distributed symmetrically, at 72° apart, about the axis of rotation. A customized asymmetric force profile may be implemented in the embodiment shown in FIG. 7 by adding extensions that create asymmetric profiles for the wings. Examples of other geometries might include for example, propeller shaped, oval shaped, square shaped, or crossed shaped geometries.

In another embodiment, the detent assembly can employ electromagnetic subcomponents whereby the number of detent positions and/or the selection of one or more dominant detent positions can be controlled electronically. According to this embodiment, the shape of each electromagnetic subcomponent may be designed such that portions of the subcomponent (e.g., one or more wings or one or more extensions of the wings) can be electronically energized (i.e. magnetized or demagnetized). According to one embodiment, in a detent assembly with a electromagnetic subcomponent, a control circuit can be coupled to the component to allow, for example, a user to adjust the number of detent positions and/or one or more preferred detent positions that are more dominant than other detent positions.

A customized force profile may also be the basis of a customized tactile feel to a magnetic detent. Referring to the embodiment shown in FIG. 7, as detent bodies 301 and 302 are moved 72° from configuration 701 to configuration 703, a self-aligning force biased toward moving the detent bodies back into configuration 701 may arise for most of the interval between configurations 701 and 703. At the midpoint (36°) between configurations 701 and 703, the self-aligning force may continue to be biased toward the more stable configuration 701 because configuration 701 is more stable than configuration 703. At some point past 36° between configurations 701 and 703, a point that depend on the precise geometries associated with the magnetic components 303 and 304, a self-aligning force will eventually arise to bias the magnetic detent toward moving detent bodies 303 and 304 to configuration 703. This unique profile of self-centering force profiles can be leveraged to create customized tactile feels for magnetic detents. The enlargement of a bulge or wing among others is but one approach to customizing force profiles in accordance with a specific embodiment of the current invention. Other approaches are also possible.

Figure 8:
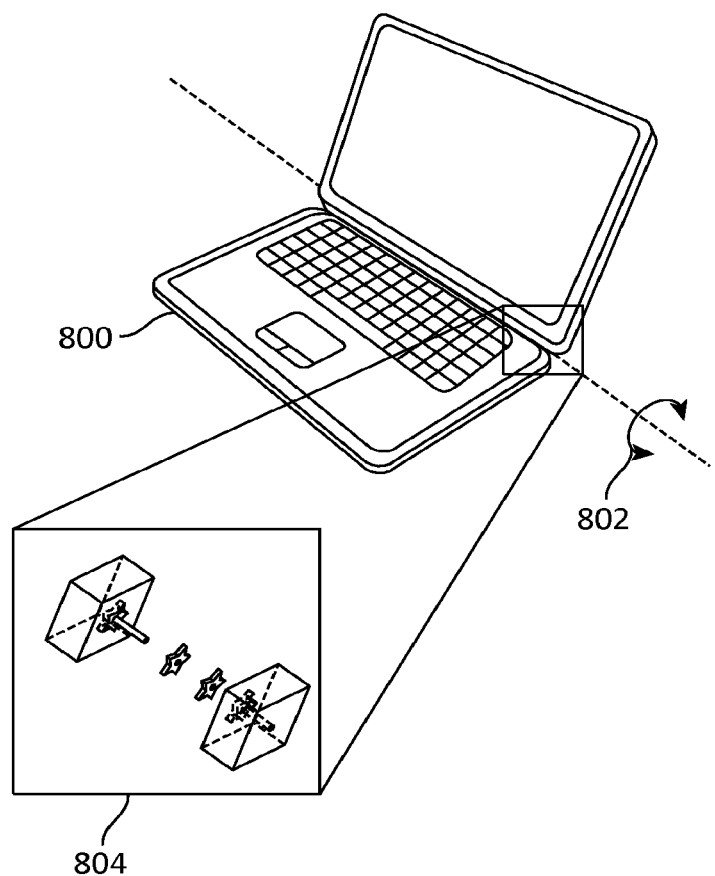
FIG. 8 shows an exemplary laptop computer that employs a magnetic detent at its hinge in accordance with one embodiment of the invention.

In other embodiments, the present invention provides devices and systems that incorporate magnetic detents. Two examples of such devices are described in connection with FIGS. 8 and 9. FIG. 8 shows laptop computer 800 with hinge 802 that employs magnetic detent 804 in accordance with one embodiment of the invention. In one specific embodiment, detent hinge 802 may be customized to provide for a predetermined set of angles at which the laptop screen can be most ergonomically displayed. In another specific embodiment, detent hinge 802 may also be customized to provide for a dominant detent position corresponding to a recommended viewing angle of the laptop screen. A variation of this embodiment may employ electromagnets in detent assembly 804 wherein the geometric asymmetries (e.g., extensions 303e and 304e in FIG. 6) can be electrically activated or deactivated to allow for the dominant detent position to be electrically set. In yet another embodiment, detent hinge 802 may also be customized to provide for customized tactile response when desired.

Figure 9:
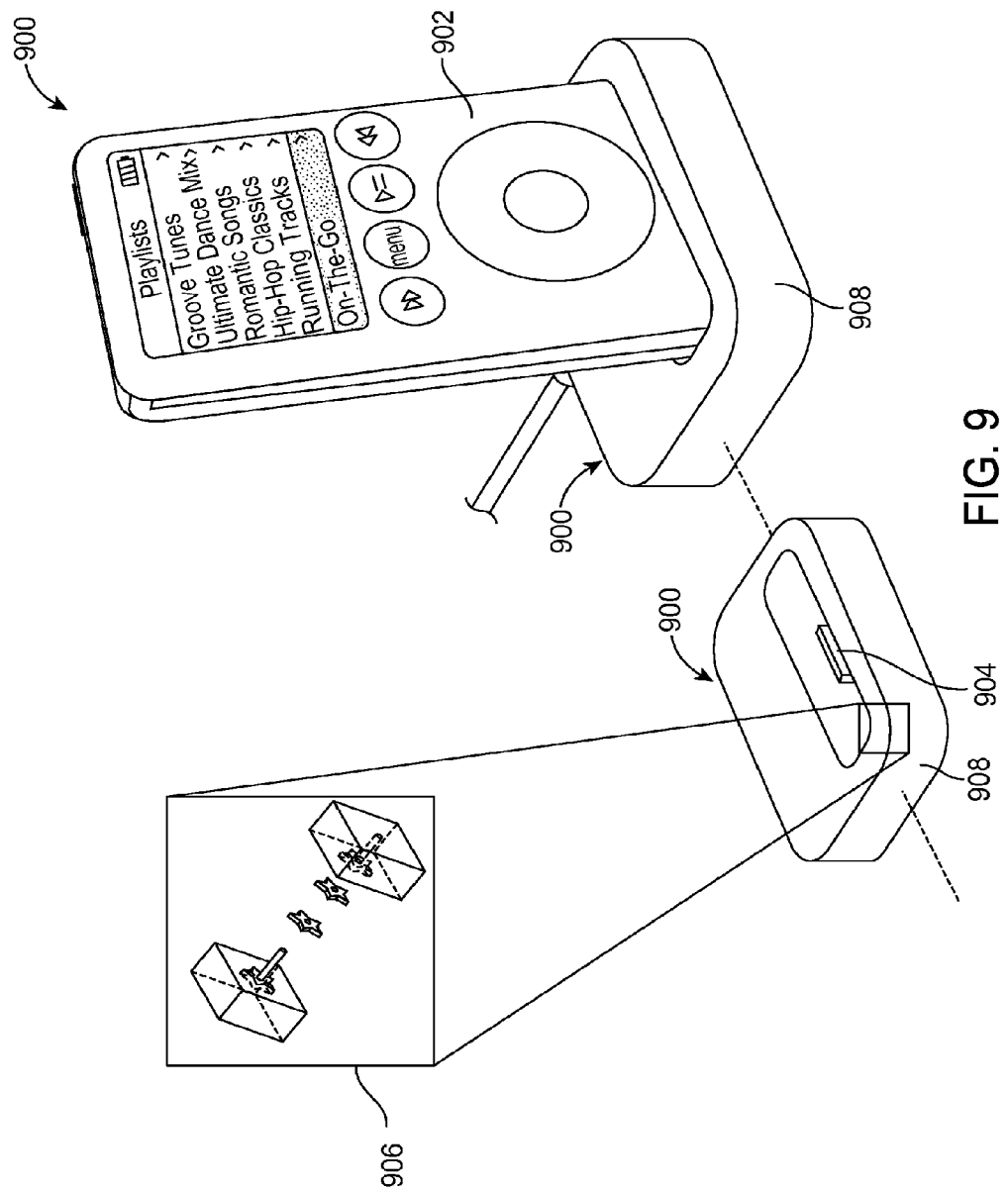
FIG. 9 illustrates an exemplary media player docking device that employs a magnetic detent providing for multiple detent positions for the docked media player in accordance with one embodiment of the invention.

FIG. 9 illustrates docking station 900 for hand-held electronic device 902 (e.g., a media player) that employs a magnetic detent in accordance with one embodiment of the invention. According to this embodiment, docking station 900 may include connector 904 that receives device 902. Connector 904 may be affixed to a board inside the body of docking station 900 by a hinge assembly that includes magnetic detent 906. Detent hinge 906 may be customized to provide for a predetermined set of angles relative to base 908 at which a user interface of device 902 can be most ergonomically displayed and used. Similar to variations discussed in connection with the laptop hinge of FIG. 8, detent hinge 906 can also be customized to provide for a dominant detent position corresponding to the best viewing angle of the player UI. An electromagnetic embodiment of detent hinge 906 allows the detent to be turned off and on according to one embodiment of the invention. An electromagnetic embodiment of detent hinge 906 may allow for selecting the dominant position electronically. In yet another preferred embodiment, the detent hinge may be adapted to provide for customized tactile response when adjusting the angle of docked device 902.

In conclusion, the present invention provides various embodiments for magnetic detents and for implementing devices and systems employing magnetic detents. While these inventions have been described in the context of the above specific embodiments, modifications and variations are possible. For example, detent assemblies according to the present invention can be held together only by magnetic attraction force or a combination of magnetic and mechanical means. Also, references to various types of materials are for illustrative purpose and other similar alternatives may also fall within the scope of the present invention. Similarly, shapes, dimensions, angles and sizes provided throughout the above description are for illustrative purposes only, and the inventive concepts described herein can be applied to structures with different dimensions. Other examples of applications of magnetic detents exist and will be readily recognized by a person of skill in the art. Accordingly, the scope and breadth of the present invention should not be limited by the specific embodiments described above and should instead be determined by the following claims and their full extend of equivalents.

What is claimed is:

1. A detent assembly comprising:
a first body including a first magnetic component characterized by a first geometry; and
a second body positionable in proximity to the first body and including a second magnetic component characterized by a second geometry;
wherein the first body and the second body are adapted to move relative to each other, and
wherein the first geometry and the second geometry are adapted to generate magnetic fields between the first magnetic component and the second magnetic component in such a way as to define a plurality of detent positions between the first body and the second body, and
wherein the detent assembly is adapted to create a first threshold magnetic force holding the first body and the second body in a first detent position and a second threshold magnetic force holding the first body and the second body in a second detent position, wherein the first threshold magnetic force is greater than the second threshold magnetic force, and
wherein the first magnetic component has a first surface section with the first geometry, and wherein the second magnetic component has a second surface section with the second geometry, and
wherein the first surface section is contiguous and entirely magnetic with a same first polarity, wherein the second surface section is contiguous and entirely magnetic with a same second polarity that is opposite the first polarity, and wherein the first surface section is opposite the second surface section.

2. The detent assembly of claim 1, wherein the first geometry and the second geometry form areas of overlap, wherein the areas of overlap formed by the first geometry and the second geometry are a predetermined function of the relative positions of the first body to the second body, and wherein the area of overlap for the first detent position is greater than the area of overlap for the second detent position.

3. The detent assembly of claim 1, wherein the first body and the second body are adapted to move relative to each other, wherein the movement is such that an amount of overlap of the first surface section and second surface section with each other changes during the movement, and wherein the first surface section and second surface section at least partially overlap during the full range of movement of the detent assembly.

4. The detent assembly of claim 1 wherein the second body is adapted to move relative to the first body along a single axis of rotation.

5. The detent assembly of claim 4 wherein the first geometry and the second geometry are characterized by an N-point star shaped geometry.

6. The detent assembly of claim 5 wherein the N-point star shaped geometry comprises N asymmetric wings, where at least one pair of the N wings is spaced at a different angle than another pair of the N wings.

7. The detent assembly of claim 5 wherein the N-point star shaped geometry comprises N asymmetric wings, where at least one of the N wings is shaped differently from another of the N wings.

8. The detent assembly of claim 7 wherein the N asymmetric wings comprises a first shape and a second shape, where the first shape is an elongated version of the second shape.

9. The detent assembly of claim 8 wherein at least one of the N asymmetric wings comprises the first shape, and at least one of the rest of the N asymmetric wings comprises the second shape.

10. The detent assembly of claim 1 wherein the second body is adapted to move relative to the first body along one linear dimension.

11. The detent assembly of claim 1 wherein the first magnetic component comprises a magnetic or ferromagnetic material and the second magnetic component comprises a magnetic, ferromagnetic, or ferrous material.

12. The detent assembly of claim 1 wherein at least one of the first magnetic component and the second magnetic component includes an electromagnetic subcomponent.

13. The detent assembly of claim 1, wherein the first geometry of the first magnetic component and the second geometry of the second magnetic component are characterized by an asymmetric shaped geometry.

14. A method of manufacturing a magnetic detent assembly, the method comprising:
fabricating a first magnetic component having a first geometry;
disposing the first magnetic component in a first body;
fabricating a second magnetic component having a second geometry;
disposing the second magnetic component in a second body; and
positioning the first body in proximity to the second body such that the first geometry of the first magnetic component and the second geometry of the second magnetic component create a magnetic force profile between the first body and the second body,
wherein the magnetic force profile defines a plurality of detent positions when the first body is moved relative to the second body,
wherein a magnetic force at a first detent position is greater than the magnetic force at a second detent position,
wherein the first geometry of the first magnetic component and the second geometry of the second magnetic component are both characterized by a flat, asymmetric surface, and
wherein the surface of the first magnetic component is positioned opposite the surface of the second magnetic component.

15. The method of claim 14 wherein the second body moves relative to the first body along at least a single axis of rotation.

16. The method of claim 15 wherein the first geometry and the second geometry are characterized by a N-point star geometry.

17. The method of claim 14 wherein the magnetic force profile in the absence of external forces align the first body with respect to the second body along one of the plurality of detent positions.

18. A detent assembly comprising:
a first body including a first magnetic component characterized by a first geometry; and
a second body positionable in proximity to the first body and including a second magnetic component characterized by a second geometry;
wherein the first body and the second body are adapted to move relative to each other,
wherein the first geometry and the second geometry are adapted to generate magnetic fields between the first magnetic component and the second magnetic component in such a way as to define a plurality of detent positions between the first body and the second body,
wherein the first magnetic component has a first surface section with the first geometry, and wherein the second magnetic component has a second surface section with the second geometry,
wherein at least one of the first surface section and the second surface section includes an electromagnetic subcomponent, wherein portions of the electromagnetic subcomponent are independently energizable,
wherein the first surface section has a same first polarity, wherein the second surface section has a same second polarity that is opposite the first polarity, and wherein the first surface section is opposite the second surface section, and
wherein a plurality of the portions of the electromagnetic subcomponent are configured to be energized concurrently.

19. The detent assembly of claim 18, further comprising:
a control circuit coupled to the electromagnetic subcomponent.

20. The detent assembly of claim 19, wherein the control circuit is configured to allow a user to adjust the number of detent positions.

21. The detent assembly of claim 19, wherein the control circuit is configured to allow a user to specify one or more preferred detent positions that are more dominant than other detent positions.

22. The detent assembly of claim 18, wherein both the first magnetic component and the second magnetic component include an electromagnetic subcomponent, wherein portions of each electromagnetic subcomponent are independently energizable.

23. The detent assembly of claim 18, wherein the first surface section is contiguous and entirely magnetic and wherein the second surface section is contiguous and entirely magnetic.

24. A detent assembly comprising:
a first body including a first magnetic component characterized by a first geometry;
a second body positionable in proximity to the first body and including a second magnetic component characterized by a second geometry; and
wherein the first body is in proximity to the second body such that the first geometry of the first magnetic component and the second geometry of the second magnetic component create a magnetic force profile between the first body and the second body,
wherein the magnetic force profile defines a plurality of detent positions when the first body is moved relative to the second body,
wherein a magnetic force at a first detent position is greater than the magnetic force at a second detent position,
wherein the first geometry of the first magnetic component and the second geometry of the second magnetic component are both characterized by a flat, asymmetric surface, and
wherein the surface of the first magnetic component is positioned opposite the surface of the second magnetic component.

* * * * *